United States Patent
de Jong et al.

(10) Patent No.: US 9,896,543 B2
(45) Date of Patent: Feb. 20, 2018

(54) COMPOSITION COMPRISING FURFURYL ALCOHOL

(71) Applicant: Furanix Technologies B.V., Amsterdam (NL)

(72) Inventors: Edserd de Jong, Amsterdam (NL); Jan Cornelis van der Waal, Amsterdam (NL); Jean-Mathieu Benoît Louis Pin, Nice (FR); Nathanaël David Cyrille Guigo, Nice (FR)

(73) Assignee: Synvina C.V., Amsterdam (NL)

( * ) Notice: Subject to any disclaimer, the term of this patent is extended or adjusted under 35 U.S.C. 154(b) by 34 days.

(21) Appl. No.: 15/102,937

(22) PCT Filed: Dec. 11, 2014

(86) PCT No.: PCT/NL2014/050852
§ 371 (c)(1),
(2) Date: Jun. 9, 2016

(87) PCT Pub. No.: WO2015/088341
PCT Pub. Date: Jun. 18, 2015

(65) Prior Publication Data
US 2016/0376406 A1    Dec. 29, 2016

(30) Foreign Application Priority Data
Dec. 12, 2013   (NL) ..................................... 2011950

(51) Int. Cl.
*C08G 65/36* (2006.01)
*B27K 3/15* (2006.01)
*C08L 71/14* (2006.01)
*B27K 3/34* (2006.01)
*C09D 171/14* (2006.01)
*C09J 171/14* (2006.01)

(52) U.S. Cl.
CPC ................ *C08G 65/36* (2013.01); *B27K 3/15* (2013.01); *B27K 3/343* (2013.01); *C08L 71/14* (2013.01); *C09D 171/14* (2013.01); *C09J 171/14* (2013.01)

(58) Field of Classification Search
CPC ........ C08G 65/36; C08L 71/14; C09J 171/14; Y10T 428/3196
See application file for complete search history.

(56) References Cited

U.S. PATENT DOCUMENTS

| 2,571,994 A | 10/1951 | Beaumont |
| 3,923,200 A | 12/1975 | Miller |
| 6,747,076 B2 | 6/2004 | Schneider et al. |

(Continued)

FOREIGN PATENT DOCUMENTS

| DE | 3621517 A1 | 1/1988 |
| EP | 0338151 A | 4/1989 |
| WO | 02/30638 A2 | 4/2002 |

(Continued)

*Primary Examiner* — Michael A Salvitti
(74) *Attorney, Agent, or Firm* — Hoffmann & Baron, LLP

(57) ABSTRACT

Composition including a first component, including furfuryl alcohol and humins and a second component including an acidic polymerization initiator. The composition can be oligomerized to a resin, which has a viscosity in the range of 0.1 to 10,000 Pa·s at 25° C., determined according to ISO3219. The resin, or a blend of furfuryl alcohol and humins as a component A and an acidic polymerization initiator as a component B, separated from each other, may form a kit for an adhesive or impregnation agent.

25 Claims, 1 Drawing Sheet

Non-isothermal DSC thermograms obtained for furfuryl alcohol/maleic anhydride (98/2) mixture (Composition A, solid (—) line) and furfuryl alcohol/humins/maleic anhydride mixtures: Composition B, dotted (⋯) line with 2%wt maleic anhydride, Composition C, dashed (----) line with 5%wt maleic anhydride and Composition D, dotted-dashed (-·-·-) line with 7.5%wt maleic anhydride.

(56) References Cited

U.S. PATENT DOCUMENTS

2006/0292366 A1 12/2006 Schneider
2013/0172628 A1 7/2013 Berlin et al.

FOREIGN PATENT DOCUMENTS

| WO | 02/068507 A1 | 6/2002 |
| WO | 2007/104514 A2 | 9/2007 |
| WO | 2007/149589 A2 | 12/2007 |
| WO | 2013/180565 A1 | 12/2013 |

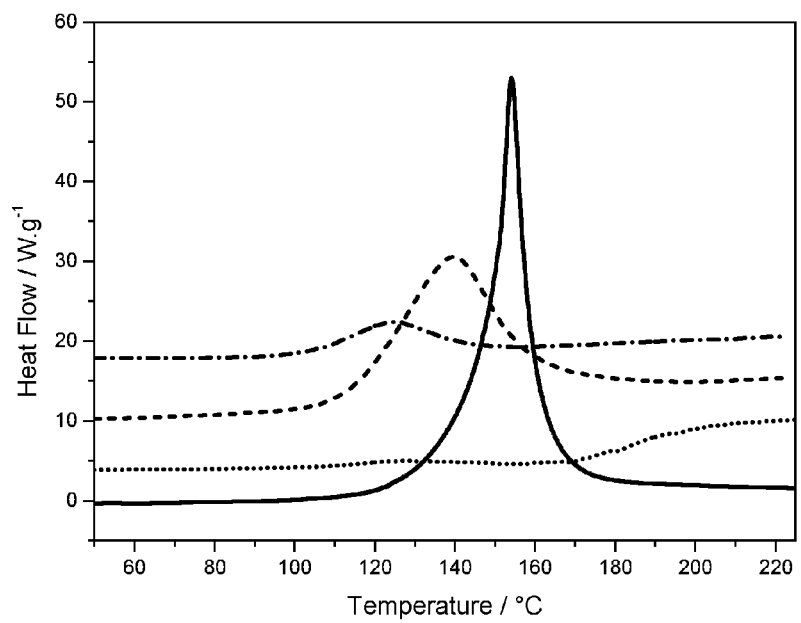
Non-isothermal DSC thermograms obtained for furfuryl alcohol/maleic anhydride (98/2) mixture (Composition A, solid (—) line) and furfuryl alcohol/humins/maleic anhydride mixtures: Composition B, dotted (⋯) line with 2%wt maleic anhydride, Composition C, dashed (----) line with 5%wt maleic anhydride and Composition D, dotted-dashed (-·-·-) line with 7.5%wt maleic anhydride.

COMPOSITION COMPRISING FURFURYL ALCOHOL

CROSS-REFERENCE TO RELATED APPLICATIONS

This application is the National Stage of International Application No. PCT/NL2014/050852 filed Dec. 11, 2014, which claims the benefit of Netherlands Application No. NL 2011950, filed Dec. 12, 2013, the contents of which is incorporated by reference herein.

FIELD OF THE INVENTION

The present invention relates to a composition comprising furfuryl alcohol, in particular a composition which comprises furfuryl alcohol and an acid. Such composition may be used for a variety of applications, including as impregnating agent, as resin, or as adhesive for e.g. wood, fibres and sand.

BACKGROUND OF THE INVENTION

From WO 02/30638 a polymerizable solution is known containing at least furfuryl alcohol and an acid compound selected from maleic anhydride, phthalic anhydride, maleic acid, malic acid, phthalic acid and a combination thereof. The solution is used to impregnate wood and the impregnated wood thus obtained is subjected to a curing step, involving the heating of the impregnated wood at a temperature of 70 to 140° C. The result is impregnated wooden article with an even dark colour.

U.S. Pat. No. 6,747,076 describes a two-part composition comprising furfuryl alcohol and a by-product of a chemical pulping process as a first component and a maleic anhydride-containing catalyst composition as second component. The by-product is a lignin-comprising polymer mixture. The two-part composition according to U.S. Pat. No. 6,747,076 is particularly suitable as wood adhesive. In that context a wooden surface to be bonded is coated with the composition and brought into contact with another wooden surface which may or may not have been coated with a similar or the same coating, and the contacting surfaces are allowed to bond under the influence of heat and pressure.

Lignin is a complex polymer of aromatic alcohols. It is commonly derived from wood and can be found in cell walls of plants. It is known as an adhesive in its natural state. Since dissolved lignin has some reactive groups that allow it to react with adhesive formulations, lignin has been employed in various wood adhesive formulations. Usually the lignin is employed as an extender in adhesives based phenol-formaldehyde resins and the like. Lignin is a cross-linked macromolecule which is relatively hydrophobic and aromatic in nature. The molecule consists of various types of substructures. The macromolecule is synthesized from various monomers, including p-coumaryl alcohol, coniferyl alcohol and sinapyl alcohol. The distribution of the monomers in lignin is dependent on plant species and tissues. However, typical structures for lignin are phenyl groups, hydroxyl and methoxy moieties and ether bonds.

Typical wood pulping processes include the sulphite, kraft and soda processes. In the latter processes wood is contacted with a sodium hydroxide and some other chemicals to yield lignin. When wood pulping is carried out using the sulphite process, ligno-sulphonates are formed. In US 2006/0292366 a formulation for impregnating wood has been described wherein in addition to furfuryl alcohol and an acidic initiator, a water-soluble stabilizer, such as the calcium or ammonium salt of a lignosulphonic acid can be used. The most reactive lignins can be isolated from an organosolv process, in which wood is subjected to pulping using organic solvents such as ethanol and/or acetone. An organosolv process is described in e.g. US 2013/172628.

U.S. Pat. No. 3,293,200 describes thermosetting adhesive compositions useful in the manufacture of plywood and containing, as essential ingredients, a water-soluble phenol-aldehyde resin and a water-insoluble, finely-divided humin material obtained from the manufacture of levulinic acid by acid hydrolysis of lignocellulose, i.e. a combination of carbohydrates and lignin. Although various procedures are known for the manufacture of levulinic acid from lignocellulose, the reaction generally is carried out under severe acid hydrolysis conditions at a temperature in excess of 150° C., usually between 170° C. and 210° C. in the presence of a strong acid catalyst. During the reaction, the humin material is formed as a result of an acid breakdown of lignocellulose while substantially the entire carbohydrate portion of the lignocellulose is degraded and the hexosans converted to the desired levulinic acid. According to U.S. Pat. No. 3,293,200 humins are the water-insoluble solid residue, containing predominantly lignin compounds. Furthermore, U.S. Pat. No. 3,293,200 states that residues obtained from acid hydrolysis of pentosan-containing lignocellulose under mild conditions to yield furfural are not contemplated in the practice of this invention. Such materials contain a substantial proportion of the original unreacted carbohydrates which remain in the residues together with the lignin.

It has been found that the formulations comprising furfuryl alcohol and an acidic initiator and formulations comprising these components together with lignin fail to provide optimal results as wood adhesive or as impregnating agent for wood and other materials. Surprisingly, it was found that the addition of humins to furfuryl alcohol and acidic initiator provided improved results over the use of furfuryl alcohol and acidic initiator alone.

In this specification humins are the coloured bodies which are believed to be polymers containing moieties from hydroxymethylfurfural, furfural, carbohydrate and levulinic acid. These coloured bodies are i.a. produced as by-products in the partial degrading of carbohydrates by heat or other processing conditions, as described in e.g. EP 338151. The use of humins has been described in DE 3621517, where it is stated that the humins, i.e. the by-product of the preparation of alkoxymethylfurfural and alkyl levulinates from cellulose, lignocellulose or starch with an alcohol, can only be used for the provision of heat by combusting it. It would therefore be very advantageous, if humins can be used in a more environmentally-friendly and value-added application.

SUMMARY OF THE INVENTION

Accordingly, the present invention provides for a composition including a first component, comprising furfuryl alcohol and humins and a second component comprising an acidic polymerization initiator.

As indicated above, humins are coloured by-products of the degrading of carbohydrates. Suitably, the humins have been obtained from the dehydration of carbohydrates. More preferably, the humins have been obtained in the dehydration of carbohydrates in the manufacture of levulinic acid, 5-hydroxymethylfurfural and/or 5-alkoxymethylfurfural. An example of such a dehydration reaction is described in DE 3621517. Another example of such a process is described in WO2007/104514. Humins are believed to be macromolecules containing furfural and hydroxymethylfurfural moieties. Further moieties that may be included in humins are carbohydrate, levulinate and alkoxymethylfurfural groups. A mechanism for the formation of humin molecules may be a polycondensation pathway, leading to a network of furan rings linked by ether and acetal bonds. A structure for humins is presented in I. van Zandvoort et al. ChemSusChem, 2013, 6, 1745-1758. In this journal article the humins structure is characterized by furan rings connected via alkylene moieties. Thus, typical for humins are furan rings and alkylene groups, such as methylene and ethylene groups, whereas other constituent groups may be hydroxyl, aldehyde, ketone, carboxylic acid and ester groups. When the dehydration of the carbohydrates into furan derivatives is carried out in the presence of an organic solvent other functional groups such as alkoxy and ester groups may be present.

Humins may also be characterized with reference to the Van Krevelen diagram. In such a diagram the hydrogen index, i.e. the atomic hydrogen:carbon ratio, and the oxygen index, i.e. the atomic oxygen:carbon ratio, are plotted against each other. It was found that humins suitably have an oxygen:carbon atomic ratio in the range of 0.20 to 0.50, preferably from 0.30 to 0.40 and a hydrogen:carbon atomic ratio in the range of 0.55 to 0.90, preferably from 0.65 to 0.80.

It has surprisingly been found that the polymerization of a mixture of humins and furfuryl alcohol can be carried out in a more controlled manner than the polymerization of furfuryl alcohol only. Whereas the exothermic polymerization of furfuryl alcohol runs the risk of a thermal runaway reaction, such risk is hardly present in the less exothermic and slower polymerization of the component comprising both furfuryl alcohol and humins.

The ratio of the furfuryl alcohol and the humins in the first component may vary within wide ranges. In a preferred embodiment the two-component composition comprises furfuryl alcohol and humins in a weight ratio of furfuryl alcohol to humins in the range of 1:10 to 10:1.

The first component can be reacted to polymerization by addition of an initiator. The initiator in the present composition is an acidic initiator. It has been found that a weak acidic initiator can be very advantageous, since the initiation reaction will proceed only very slowly. Due to the fact that the initiation proceeds slowly, also the polymerization hardly occurs, resulting in a viscous solution, or does not occur at all. Therefore, the pot life of the complete composition is long and the composition can thus be stored for a long period. The ultimate curing of such compositions may then take place via heating the composition so that a thermosetting polymer is obtained. The curing is suitably effected by heating the composition to a temperature in the range of 50 to 200° C., preferably from 90 to 160° C. In such a case the second component preferably comprises an acidic polymerization initiator which has a pKa at 25° C. of at least 3. Such initiators can be selected from Brønsted and Lewis acids. The acidic initiators may be organic or inorganic. Examples of inorganic Lewis acids include aluminium trihalide, e.g. trichloride, boron halide, e.g. trichloride, zinc halide, e.g. dichloride, iron halide, such as ferrous chloride and ferric chloride, chromium halide, such as chromium trichloride, and iodine. Preferably, the acidic initiator is organic and suitably selected from maleic anhydride, phthalic anhydride, formic acid, maleic acid, malic acid, phthalic acid, furoic acid, benzoic acid, furan-dicarboxylic acid, citric acid, levulinic acid and combinations thereof.

The acidic initiator is suitably added in an amount that provides for a sufficiently fast and complete polymerization reaction, especially when heated to the desired thermosetting temperature. Preferably, the amount of acidic initiator is in the range of 0.5 to 10% wt, based on combined amount of furfuryl alcohol and humins.

When a relatively fast polymerization is desired and/or when the polymerization is preferably carried out at relatively low temperatures, the acid initiator may be selected from strong acids, i.e. acidic initiators with a $pK_a$ of less than 3. In such a case the acidic initiator is suitably added to the combination of furfuryl alcohol and humins just before the application of the complete composition.

The first component, the second component or both components may not only contain the compounds indicated, but may also include one or more additional compounds, optionally selected from additional monomers, co-catalysts, diluents, fillers and combinations thereof.

Additional monomers may advantageously be selected from 5-hydroxymethylfurfural (HMF), 2-(2-hydroxyacetyl) furan, 5-alkoxymethylfurfural, formaldehyde, methyl formate, levulinic acid, alkyl levulinates, 2,5-diformyl-furan, carbohydrates and furfural and combinations thereof. The use of these monomers has the advantage that similar moieties can already be present in the humins so that these additional monomers seamlessly integrate with the polymer of furfuryl alcohol and the humins. The relative amount of these additional monomers may vary within wide ranges. When they are elected from the compounds hereinabove, these compounds have groups that are also present in humins. Therefore they can be added to the humins in very small to extremely large quantities. Generally, economic considerations promote that a small amount of additional monomers is used and a large amount of the by-product humins. Commonly, the amount of additional monomers may vary from 0 to 20% wt, based on the combined amount of furfuryl alcohol and humins.

In addition, either of the components may also contain a prepolymer of furfuryl alcohol.

The prepolymer is a resinous product and is available under the trademark BioRez™ and Furolite™ (ex TransFurans Chemicals). The preparation of these prepolymers is known in the art. An example of a known preparation method is described in U.S. Pat. No. 2,571,994.

Additional co-catalysts are those compounds that facilitate the polymerization. Examples thereof include solid inorganic Lewis acids. In a preferred embodiment the co-catalysts are selected from those compounds that have also been mentioned as suitable inorganic initiators. They may be added to the organic acidic initiators. Therefore, the co-catalysts are suitably selected from aluminium trihalide, e.g. trichloride, boron halide, e.g. trichloride, zinc halide, e.g. dichloride, iron halide, such as ferrous chloride and ferric chloride, chromium halide, such as chromium trichloride, iodine, and combinations thereof. The amount of the co-catalyst in weight percent may vary, but is typically lower than the amount of the acidic initiator. Especially when the acidic initiator is an organic acid with a $pK_a$ of at least 3, the amount of the co-catalyst tends to be lower. Typically the co-catalyst is present in an amount of 10 to 70% wt, based on the weight of the acidic initiator.

The composition according to the present invention may also contain one or more diluents. The diluent is especially suitable when the viscosity of the composition is to be lowered, so that the application of the composition via impregnation or pouring is facilitated. It is evident that when the composition is applied as an adhesive, it may be desirable that the composition has a relatively high viscosity, so that a diluent is added in a limited amount or not at all. When a diluent is used, such a diluent has suitably been selected from water, alcohols, preferably methanol, ethanol, propanol or a butanol, ketones, preferably acetone or methyl ethyl ketone, dimethyl sulphoxide, dimethyl formamide and combinations thereof. The diluent can generally be present in a variety of amounts, dependent on the eventual use. Typical amounts of diluents range from 0 to 30% wt, based on the combined amount of furfuryl alcohol and humins.

In addition to monomers, co-catalysts and diluents, the composition may also comprise fillers. Fillers may be added for a variety of purposes. To promote additional adhesive properties, another adhesive compound may be added, e.g. lignin. Other fillers include plasticizers, such as vegetable oils, alkyl phthalates, alkyl furanoates and alkyl esters of rosin or abietic acid such as methyl abietate, talc, lime, dyestuffs, wood flour, saw dust, bone flour clay and combinations thereof. When a dyestuff is added, it has usually a relatively dark colour, since the dark-coloured humins tend to provide a grey to black colour to the polymer when it has been cured. As an example for a suitable the dyestuff the dark-red iron oxide can be referred to. It will be clear that the amount of fillers can vary over a wide range. In practice, they may be added in amounts ranging from 1 to 300% wt, based on the weight of furfuryl alcohol, humins and acidic initiator. However, it is also possible to refrain from adding any filler at all.

The composition comprising furfuryl alcohol, humins and the acidic initiator tends to have a low viscosity. Therefore it is excellently suited for impregnating material, in particular wood. When the polymerization reaction is then started, the impregnated material gets reinforced and a cured material is obtained. When wood is used as material to be impregnated, the result is a pseudo hardwood that has excellent weather resistance and improved strength. However, when the composition is to be used as adhesive, the low viscosity may act as a drawback. When the low-viscosity composition is applied to a substrate, the layer of the composition on the substrate may then be so thin, that insufficient bonding is obtained after curing. It is therefore advantageous to increase the viscosity so that a sufficiently thick layer may be applied that provides bonding between two pieces of material. It is feasible to obtain a composition with a higher viscosity by adding thickeners. However, it is preferred to use an oligomer of a humins and furfuryl alcohol composition. Such oligomer can be produced by starting the polymerization of furfuryl alcohol and humins but without completing the polymerization, i.e. an oligomerization. Such can be achieved by heating a mixture of furfuryl alcohol and humins under mechanical stirring to a desired temperature typically in the range of 50 to 110° C. such that the mixture allows for sufficient flow of the humins. The mixing was continued until a homogeneous blend was created. This means that no phase separation occurs when the stirring is stopped. A homogeneous mixture is generally obtained after 5 to 20 min of stirring whilst heating. When a homogeneous mixture is obtained a weak acidic initiator e.g. a weak acidic initiator as described above, is added to the mixture to start the polymerization of furfuryl alcohol and humins. In such a case the amount of acidic initiator is adapted such that it is preferably completely consumed before the polymerization is complete. The amount of acidic catalyst is then preferably in the range of 0.5 to 4.5% wt based on the combined amount of furfuryl alcohol and humins. The heating is continued for a period, which typically is in the range of 10 to 45 min. When the reaction mixture presents the desired viscosity, the heating is stopped. Alternatively, the oligomer may be produced in one step, wherein furfuryl alcohol, humins and acidic initiator are stirred whilst heating, and the reaction is continued until the desired viscosity is obtained. The result is a resin that has a certain viscosity. This resin constitutes a prepolymer that can be polymerized further. The further polymerization is achieved by adding an additional amount of acidic initiator. This initiator may or may not be the same as the one that was used in the preparation of the oligomer. Accordingly, the present invention also provides a composition comprising a resin obtainable by the oligomerization of the above-described composition, which resin has a viscosity in the range of 0.1 Pa·s to 10,000 Pa·s at 25° C., preferably a viscosity of 1 Pa·s to 5000 Pa·s at 25° C., determined according to ISO 3219 and an acidic polymerization initiator. The invention also provides the resin per se.

The resin may comprise any of the additional compounds that have been described above. Also the relative amounts and the reactants that have been described hereinabove may be comprised in the resin.

As indicated above, the acidic initiator is suitably such that it has a $pK_a$ of at least 3. This allows for a slow initiation and thus for a long shelf life. However, the mere presence of the initiator may cause some unintended polymerization. Therefore it is advantageous if the acidic initiator is not in contact with the first component or the resin obtained after oligomerization during storage. Accordingly, the present invention also provides for a kit for an adhesive or impregnating agent, containing, separated from each other, a first component comprising a blend of furfuryl alcohol and humins, or a resin obtainable by the oligomerization of such a blend, which has a viscosity in the range of 0.1 Pa·s to 10,000 Pa·s at 25° C., preferably a viscosity of 1 Pa·s to 5000 Pa·s at 25° C., determined according to ISO 3219, as a component A, and an acidic polymerization initiator as a component B.

Component B is usually in combination with other compounds. Component B preferably comprises a solution of the acidic initiator in furfuryl alcohol and/or humins. This is particularly suitable in the case of a weakly acidic initiator. The composition of component B according to the present invention may also suitably contain one or more other diluents. The diluent is especially suitable when the viscosity of the composition, i.e. the combination of components A and B, is to be lowered so that the mixing of the components is made easier or the application of the mixture of components A and B via impregnation of pouring is facilitated. When the composition is used as an adhesive, it may be desirable that the composition has a relatively high viscosity, so that a diluent is added in only a limited amount, or not added at all. When a diluent is used, such a diluent has suitably been selected form the group consisting of water, alcohols, aldehydes, ketones, dimethyl sulphoxide, dimethyl formamide, esters and combinations thereof. Suitable alcohols include methanol, ethanol propanol and butanols. Suitable ketones include acetone and methyl ethyl ketone. A suitable ester is methyl levulinate. The amount of diluent may vary within wide ranges, dependent on the eventual use, as indicated already. Typical amounts of diluents range from 0 to 30% wt, based on the amount of furfuryl alcohol and humins.

Component B may also be provided in the absence of any furfuryl alcohol and/or humins. This will be especially advantageous when the acidic initiator is a strong acid. Since component B in such a situation is separate from the blend of furfuryl alcohol and humins or from the resin, the polymerization of the blend or resin is not initiated, thereby showing an excellent shelf life.

The kit may suitably comprise further additional compounds, optionally selected from additional monomers, co-catalysts, fillers and combinations thereof. These additional compounds may be added to one of the blend, resin or acidic initiator. Moreover, such additional compounds may be added to both component A and component B. However, it is preferred that these additional compounds have been packaged separately from the component A and component B.

The acidic initiator may be an acidic compound with a $pK_a$ of at least 3. Such acidic initiators, being weak acids, tend to have a relatively low activity. When strong acids are being used, the initiation runs faster and the polymerization takes place a lot quicker. Therefore the use of such strong acids is usually avoided when the acidic initiator is stored in contact with the furfuryl alcohol and humins. However, when they are stored separately in a kit according to the invention it may be advantageous to use strong acids. Therefore the kit according to the present invention for certain applications preferably contains an acidic initiator of component B, selected from the group consisting of strong acids with a $pK_a$ at 25° C. of less than 3. Suitably, mineral inorganic acids or strong organic acids are being used, the initiator preferably being selected from the group consisting of p-toluene sulphonic acid, methane sulphonic acid, mineral acids, such as $H_2SO_4$, HCl, HBr, $H_3PO_4$ and $HNO_3$, and combinations thereof. The use of strong acids avoids the necessity to complete the polymerization by applying heat. However, when the complete polymerization must proceed quickly when strong acids (having a $pK_a$ at 25° C. of less than 3) are used, it may be advantageous to cure also these compositions by heating. In such cases when strong acids are used, the curing is suitably effected by heating the composition to a temperature in the range of 40 to 120° C., preferably from 60 to 90° C.

The composition according to the present invention may be prepared as follows. A carbohydrate may be converted to hydroxymethylfurfural, levulinic acid or their alkyl derivatives, e.g. as described in DE 3621517 or WO 2007/104514. In addition to the desired products, humins are produced. These humins are separated from the reaction mixture. Furfuryl alcohol is added in the desired quantity to the humins. Dependent on the acid initiator involved, a weak acid, i.e. an acid with a $pK_a$ of at least 3 at 25° C., is added to the blend of humins and furfuryl alcohol. Alternatively, the acid initiator is kept separately from the blend and is not mixed with the blend until the complete composition is to be used, e.g. by impregnating a wooden object.

The composition can advantageously be used in a variety of applications, in particular for preserving and processing wooden materials. One advantageous application is the use of the composition in the impregnation of a wooden object so as to render it into a long-lasting, hardwood-type material. Thereto the invention provides a process for manufacturing reinforced objects comprising:

providing a composition as described above;
impregnating the object with the composition; and
heating the thus impregnated object to obtain a reinforced object.

The process is especially suitable for the manufacture of reinforced wooden objects. Impregnation of the wooden object may be carried out by using an initial vacuum, e.g. 1 to 100 mbar, for a period of time, e.g. 0.1 to 0.5 hr, followed by applying a super-atmospheric pressure for another period, e.g. 0.1 to 1.0 hr. Such a super-atmospheric pressure may range up to 20 bar. The skilled person will realize that variations of pressure and reaction durations are possible. Other impregnation methods, e.g. soaking the object in a solution, are also possible.

The heating may also be carried out in a variety of ways. The wooden object may, after impregnation be exposed to a hot air oven, but also to steam, hot oil, water bath, IR radiation, microwave heating, sonification or to any other manner of applying heat. The temperature to which the wooden object is heated is typically in the range of 40 to 180° C., preferably from 80 to 140° C.

If the object tends to get burnt if it is exposed to hot air, it may be desirable to heat the impregnated object in an inert atmosphere, i.e. an atmosphere with a reduced amount of oxygen, i.e. below 20 vol %, preferably below 5 vol %, e.g. from 20 to 1 vol %, based on the atmosphere.

The wooden object may be selected from any woody material, including shelves and veneer, but also wood composites, such as strand board, fibre board, particle board and plywood. The wood may originate from any wood species, including beech, birch, spruce, pinewood and any other wood species. Accordingly the wooden object may be selected from softwood, hardwood, plywood, wooden hardboard, strand board, fibre board, particle board or wood chips.

The impregnation can be carried out such that the amount of the composition according to the present invention in the wooden object is in the range of 1 to 60% wt, preferably 5 to 35% wt, based on the weight of the wooden object and the composition according to the invention.

The impregnation and heating treatment may also be applied to objects that have been made from different materials. Hence, it is possible to apply these treatments to an object, suitably selected from the group consisting of glass fibres, carbon fibres, natural fibres, polymer fibres and combinations thereof, preferably polymer fibres, wherein the polymer is a polyester such as polyalkylene terephthalate, polyalkylene naphthalate or polyalkylene furandicarboxylate, polyamides, such as nylon-6,6, nylon-6 or aramide. Another suitable polyamide comprises 2,5-furandicarboxylate moieties and diamine residues, such as poly(hexamethylene-2,5-furandiamide).

Another advantageous use of the composition according to the present invention is its application as adhesive. The composition is thereto suitably first oligomerized to yield a resin with a viscosity of 0.1 to 10,000 Pa·s, according to ISO 3219, as described above. The thus obtained resin is suitably used as adhesive. Accordingly, the present invention also provides a process for binding an article to a substrate by
providing a composition comprising a resin obtainable by the oligomerization of the composition as described above, which has a viscosity in the range of 0.1 to 10,000 Pa·s at 25° C., determined according to ISO3219, and an acidic polymerization initiator;
applying a coating of the composition to at least a part of at least one of the article and the substrate;
contacting the article and the substrate to obtain a structure; and
heating the structure to obtain a bonded structure.

The adhesive can be suitably applied in the foundry industry and in furan cement.

Also in this case, the process is suitably applied to a substrate and an article of which at least one is wood. Therefore, the process is preferably applied when at least one of the article and the substrate is made of wood. The wooden substrate and/or the wooden article may be of the same type as the wooden article described above. The heating step may be accompanied by the application of some pressure. However, it is observed that the pressure does not need to be very high. A mere assurance that the contact between the substrate and the article is not broken suffices. Alternatively, a hot press may be applied. As is usual in the pressing of wooden products the preferred temperature range is from 80 to 250° C., preferably from 140 to 220° C. The duration of maintaining the contact of substrate and article tends to be dependent on the temperature. Typically, the duration is in the range of 0.1 to 1.0 hr.

The article or substrate may be selected from a variety of forms and shapes and material. Suitably, the article, the substrate, or both are selected from the group consisting of veneer, shelves, softwood, hardwood, plywood, wooden hardboard, strand board, fiber board, particle board, wood chips and combinations thereof.

The composition after polymerization provides a smooth and wear-resistant surface. Therefore it is very suitable as a coating to protect the substrate thereunder. The coating is suitably applied by a process, comprising:
 providing a composition comprising a resin obtainable by the oligomerization of the composition as described above, which has a viscosity in the range of 0.1 to 10,000 Pa·s at 25° C., determined according to ISO 3219, and an acidic polymerization initiator;
 applying a coating of the composition to at least a part of a substrate; and
 heating the coated substrate.

The heating may be effected in the same temperature range as described in relation to impregnated objects or bonded structure. In this case the application of pressure is not needed. The coating is cured to a smooth surface, protecting the substrate against wear and corrosion.

It is evident that the present invention provides a versatile composition that can be used in a variety of applications.

BRIEF DESCRIPTION OF THE DRAWING

The FIGURE shows the thermograms that were determined by Differential Scanning calorimetry (DSC) for the polymerization of several polymerizable compositions.

DETAILED DESCRIPTION OF THE INVENTION

The FIGURE shows the thermogram for a composition A, comprising 98% wt of furfuryl alcohol and 2% wt of maleic anhydride as acidic initiator. It further shows the thermograms for the polymerization of mixtures of 70 parts by weight (pbw) furfuryl alcohol and 30 pbw humins with different amounts of maleic anhydride as acidic initiator. Composition B contained 2.5% wt maleic anhydride, Composition C contained 5% wt maleic anhydride and Composition D contained 7.5% wt maleic anhydride, all percentages based on the combined amount of maleic acid and the mixture of furfuryl alcohol and humins.

The FIGURE shows that the heat flux of the polymerization of furfuryl alcohol takes place at a sharp peak, indicating that the increase of the heat flux is significant.

The thermogram for Compositions C and D are more flat and thus show that the polymerization takes place at a lower temperature and lower rate, so that the reactions are better controllable.

The thermograms for Compositions C and D show that up to a temperature of about 90° C. the polymerization does not occur. At higher temperature the polymerization only takes place at a very slow rate. The FIGURE further shows that the Compositions C and D can be excellently used for the preparation of a prepolymer or oligomer because the shelf lives for compositions C and D are excellent. Composition B does not cure until at more elevated temperature. The thermogram of this composition shows that the components can well be added together without significant reaction.

The invention will be further illustrated by means of the following examples.

EXAMPLE 1

One-Step Preparation of Resin

Furfuryl alcohol, humins (Table 1, Composites 1-4) and 2% wt maleic anhydride based on the amount of acid, furfuryl alcohol and humins or lignin, were mixed in one pot and heated at 125° C. for 30 minutes, subsequently heated for 30 minutes at 145° C.

In another experiment furfuryl alcohol and humins (Table 1, Composite 5) were mixed at 105° C. for 20 minutes with 5% wt maleic anhydride, based on the amount of acid, furfuryl alcohol and humins. The temperature was retained for 10 minutes. After the period of heating, the mixtures were cooled down to room temperature and resins were obtained that could be stored for weeks. The viscosities of the resulting resins were between 1 Pa·s. and 5000 Pa·s at 25° C.

TABLE 1

| Composite | Furfuryl alcohol, % wt | Humins, % wt | Maleic anhydride, % wt |
|---|---|---|---|
| 1 | 78.4 | 19.6 | 2 |
| 2 | 68.6 | 29.4 | 2 |
| 3 | 59 | 39 | 2 |
| 4 | 49 | 49 | 2 |
| 5 | 66.5 | 28.5 | 5 |

EXAMPLE 2

Two-Step Preparation of Resin

In a two-step resin formulation procedure furfuryl alcohol and humins (Table 2, Composites 6-7) were mixed at 105° C. during 20 minutes. Maleic anhydride (2.5% by weight) was added and the mixture was heated at 120-130° C. for 30 to 60 minutes. After this step, the reaction mixture was cooled down to 80° C. and a second addition of acid initiator (2.5% wt, based on the amount of acid, furfuryl alcohol and humins) was made and at this temperature stirring was continued for 5 minutes. Subsequently, the resin was cooled down to room temperature. The viscosity thereof was determined at two temperatures. It could be stored for weeks without significant increase of the viscosity.

TABLE 2

| Composite | Furfuryl alcohol, % wt | Humins, % wt | Maleic anhydr, % wt | Viscosity at 25° C. (Pa · s) | Viscosity at 50° C. (Pa · s) |
|---|---|---|---|---|---|
| 6 | 40 | 55 | 2.5 * 2 | 627 | 26.2 |
| 7 | 20 | 75 | 2.5 * 2 | 2260 | 59.1 |

EXAMPLE 3

Resins of furfuryl alcohol and maleic anhydride were prepared using the method of Example 1 or 2. In an experiment (Table 3, Composite B and F) furfuryl alcohol was heated to 90° C. and 2% wt or 5% wt, respectively, of maleic anhydride, based on the amount of acid and furfuryl alcohol, was added and stirred for 60 min. After the period of heating, the mixtures were cooled down to room temperature and resins were obtained.

In another experiment (Table 3, Composite G) furfuryl alcohol and maleic anhydride (2.5% by weight) were mixed at 110° C. for 40 minutes. Thereafter the second addition of acid initiator (2.5% by weight) was made in the same way as for the experiment with furfuryl alcohol and humins, described in Example 2. The resin obtained was at room temperature.

A further experiment was conducted using a humins component that was enriched with additional monomers, viz. 5-hydroxymethyll furfural (HMF), 5-methoxymethyl furfural (MMF) and levulinic acid (LA) (Table 3, Composite L). In other aspects it was the same as Composite H.

Also resins with different amounts of furfuryl alcohol, humins and maleic anhydride were made using the procedures of Example 1 or 2. One resin (Table 3, Composite K) was prepared similar to the procedure of Example 2, but the second addition of acid initiator was accomplished by the addition of 1% wt sulphuric acid in stead of 2.5% wt of maleic acid.

Finally, one resin was prepared using furfuryl alcohol, lignin and maleic anhydride (Table 3, Composite J). For the lignin formulation, the maleic anhydride addition was carried out at 80° C. and then the resin was cooled down immediately to room temperature in a water bath.

The amounts of the components are shown in Table 3.

Composites were made using Whatman 40 filter paper and resin at 50/50% by weight. The composites obtained were cured at 160 or 170° C. for 3 hours. Composites strips with 40×10×0.25 mm as dimensions were made for each resin formulation. The mechanical properties (tensile strength and modulus) of the cured composites using different humins ratios and different curing conditions are presented in Table 3. For comparison reasons the tensile strength and modulus for the untreated filter paper were also determined (Composite A).

TABLE 3

| Composite | Furfuryl alcohol, % wt | Humins, % wt | Maleic anhydride, % wt | Preparation according to Example | Curing Temp. (° C.) | Curing Time (hour) | Tensile Strength (MPa) | Modulus (GPa) |
| --- | --- | --- | --- | --- | --- | --- | --- | --- |
| A | — | — | — | — | — | — | 9.1 | 1.4 |
| B | 98 | — | 2 | 1 | 170 | 3 | 26.2 | 3.3 |
| C | 78.4 | 19.6 | 2 | 1 | 170 | 3 | 28.7 | 2.7 |
| D | 68.6 | 29.4 | 2 | 1 | 170 | 3 | 26.5 | 4.0 |
| E | 49 | 49 | 2 | 1 | 170 | 3 | 31.8 | 4.2 |
| F | 95 | — | 5 | 1 | 160 | 3 | 13.4 | 3.2 |
| G | 95 | — | 5 | 2 | 160 | 3 | 14.8 | 3.5 |
| H | 40 | 55 | 5 | 2 | 160 | 3 | 29.3 | 4.0 |
| I | 20 | 75 | 5 | 2 | 160 | 3 | 31.1 | 3.1 |
| J | 40 | 55[b] | 5 | 1 | 160 | 3 | 16.1 | 3.9 |
| K | 40 | 55 | 2.5[c] | 2 | 160 | 3 | 23.7 | 3.7 |
| L[a] | 40 | 55 | 5 | 2 | 160 | 3 | 30.0 | 4.2 |

[a]Humins in Composite L contained humins enriched with monomers MMF, HMF and LA. In other aspects it was the same as Composite H.
[b]Organosolv lignin was used instead of humins.
[c]In 2 step formulation first step was with 2.5% wt maleic anhydride, second step with 1% wt H$_2$SO$_4$.

The experiments show that the formulations that contained furfuryl alcohol and humins had a higher tensile strength and modulus than the corresponding resins containing furfuryl alcohol only. The results of composite J show that humins also perform better than lignin.

The invention claimed is:

1. A composition including a first component, comprising furfuryl alcohol and humins and a second component comprising an acidic polymerization initiator.

2. The composition according to claim 1, wherein the humins have been obtained from the dehydration of carbohydrates.

3. The composition according to claim 1, wherein the weight ratio of furfuryl alcohol to humins in the first component is in the range of 1:10 to 10:1.

4. The composition according to claim 1, wherein the second component comprises an acidic polymerization initiator which has a pK$_a$ at 25° C. of at least 3.

5. The composition according to claim 1, wherein the acidic initiator is selected from maleic anhydride, phthalic anhydride, formic acid, maleic acid, malic acid, phthalic acid, furoic acid, benzoic acid, furan-dicarboxylic acid, citric acid, levulinic acid and combinations thereof.

6. The composition according to claim 1, wherein the amount of acidic initiator as second component is in the range of 0.5 to 10% wt, based on furfuryl alcohol and humins.

7. The composition according to claim 1, wherein the first component, the second component or both the first and the second component comprise(s) one or more additional compounds, optionally selected from additional monomers, co-catalysts, diluents, fillers and combinations thereof.

8. The composition according to claim 7, wherein the additional monomers have been selected from 5-hydroxymethylfurfural, 2-(2-hydroxyacetyl)furan, 5-alkoxymethylfurfural, formaldehyde, methyl formate, levulinic acid, alkyl levulinates, 2,5-diformyl-furan, carbohydrates, furfural, prepolymer of furfuryl alcohol and combinations thereof.

9. The composition according to claim 7, wherein the co-catalyst is comprised in the second component and is optionally selected from the group consisting of aluminium trihalide, boron trihalide, zinc halide, iron halide, chromium halide, iodine and combinations thereof.

10. The composition according to claim 7, wherein the diluent has been selected from water, alcohols, ketones, esters, dimethyl sulphoxide, dimethyl formamide and combinations thereof.

11. The composition according to claim 7, wherein the filler has been selected from plasticizers, talc, lime, dyestuffs, wood flour, saw dust, bone flour clay and combinations thereof.

12. A resin obtainable by the oligomerization of the composition according to claim 1, which resin has a viscosity in the range of 0.1 Pa·s to 10,000 Pa·s at 25° C., determined according to ISO 3219.

13. A composition comprising:
a resin obtainable by the oligomerization of the composition according to claim 1, which has a viscosity in the range of 0.1 to 10,000 Pa·s at 25° C., determined according to ISO 3219; and
an acidic polymerization initiator.

14. A kit for an adhesive or impregnating agent containing, separated from each other,
a first component comprising a blend of furfuryl alcohol and humins, or a resin obtainable by the oligomerization of the composition according to claim 1, which has a viscosity in the range of 0.1 to 10,000 Pa·s at 25° C., determined according to ISO 3219, as a component A, and
an acidic polymerization initiator as a component B.

15. The kit according to claim 14, which comprises additional compounds, optionally selected from additional monomers, co-catalysts, diluents, fillers, and combinations thereof, that have been packaged separately from the component A and component B.

16. The kit according to claim 14, wherein the acidic initiator of Component B is selected from the group consisting of strong acids with a $pK_a$ at 25° C. of less than 3.

17. The kit according to claim 16, wherein the acidic initiator is selected from the group consisting of p-toluene sulphonic acid, methane sulphonic acid, mineral acids, and combinations thereof.

18. The kit according to claim 14, wherein the acidic initiator of Component B is selected from the group consisting of weak acids with a $pK_a$ at 25° C. of at least 3.

19. A process for manufacturing reinforced objects comprising providing a composition according to claim 1; impregnating the object with the composition; and heating the thus impregnated object to obtain a reinforced object.

20. The process according to claim 19, wherein the object is a wooden object, suitably selected from softwood, hardwood, plywood, wooden hardboard, strand board, fibre board, particle board or wood chips.

21. The process according to claim 19, wherein the object is selected from the group consisting of glass fibres, carbon fibres, natural fibres, polymer fibres and combinations thereof.

22. The process for binding an article to a substrate by providing a composition according to claim 12; comprising:
applying a coating of the composition to at least a part of at least one of the article and the substrate;
contacting the article and the substrate to obtain a structure; and
heating the structure to obtain a bonded structure.

23. The process according to claim 22, wherein at least one of the article and the substrate is made of wood.

24. The process according to claim 22, wherein the article, the substrate, or both are selected from the group consisting of veneer, shelves, softwood, hardwood, plywood, wooden hardboard, strand board, fibre board, particle board, wood chips and combinations thereof.

25. A process for coating a substrate, comprising:
providing a composition according to claim 12;
applying a coating of the composition to at least a part of the substrate; and
heating the coated substrate.

* * * * *